United States Patent [19]

Dowdle

[11] Patent Number: 5,844,210
[45] Date of Patent: Dec. 1, 1998

[54] ICE FISHING HOLE HEATER

[76] Inventor: Jeffrey R. Dowdle, 195 17th Ave. SW., New Brighton, Minn. 55112

[21] Appl. No.: 652,800

[22] Filed: May 23, 1996

[51] Int. Cl.⁶ .................................................. H05B 3/06
[52] U.S. Cl. .................... 219/523; 219/535; 219/542; 219/544; 126/271.1
[58] Field of Search ................... 219/520, 521, 219/523, 533, 534, 536, 538, 541, 544, 546, 548, 552, 553; 43/4, 17; 126/271.1, 271.3

[56] References Cited

U.S. PATENT DOCUMENTS

| | | | |
|---|---|---|---|
| 2,423,488 | 7/1947 | Dowe | 219/523 |
| 2,797,296 | 6/1957 | Fowler et al. | 219/523 |
| 3,407,283 | 10/1968 | Peterson | 219/317 |
| 3,563,227 | 2/1971 | Ruter | 126/271.1 |
| 4,006,732 | 2/1977 | Schumm | 126/271.1 |
| 4,294,030 | 10/1981 | Stewart | 43/4 |
| 4,438,757 | 3/1984 | Anderson | 126/360 R |
| 4,612,910 | 9/1986 | Williams | 126/360 R |
| 4,739,747 | 4/1988 | Johnson | 126/271.1 |
| 4,911,141 | 3/1990 | Manuel | 126/271.1 |
| 5,667,712 | 9/1997 | Sutorius et al. | 219/535 |

*Primary Examiner*—Tu B. Hoang
*Attorney, Agent, or Firm*—Kinney & Lange, P.A.

[57] ABSTRACT

An electrical heating device to prevent freezing of water within an ice fishing hole which includes a sleeve, an electrical resistance heater and a pair of electrical leads. The sleeve substantially forms a circle with an inner and an outer surface. The outer surface contacts the ice at the periphery of the ice fishing hole with sufficient outward pressure to suspend the heating device within the ice fishing hole. The electrical resistance heater is mounted to the inner surface of the sleeve and includes an electrical resistance heating element (or elements) enclosed within a waterproof jacket. The waterproof jacket forms a substantially circular base which is connected around the inner surface of the sleeve. The pair of electrical leads extend from the electrical resistance heater and connect the electrical resistance heater to a battery.

9 Claims, 3 Drawing Sheets

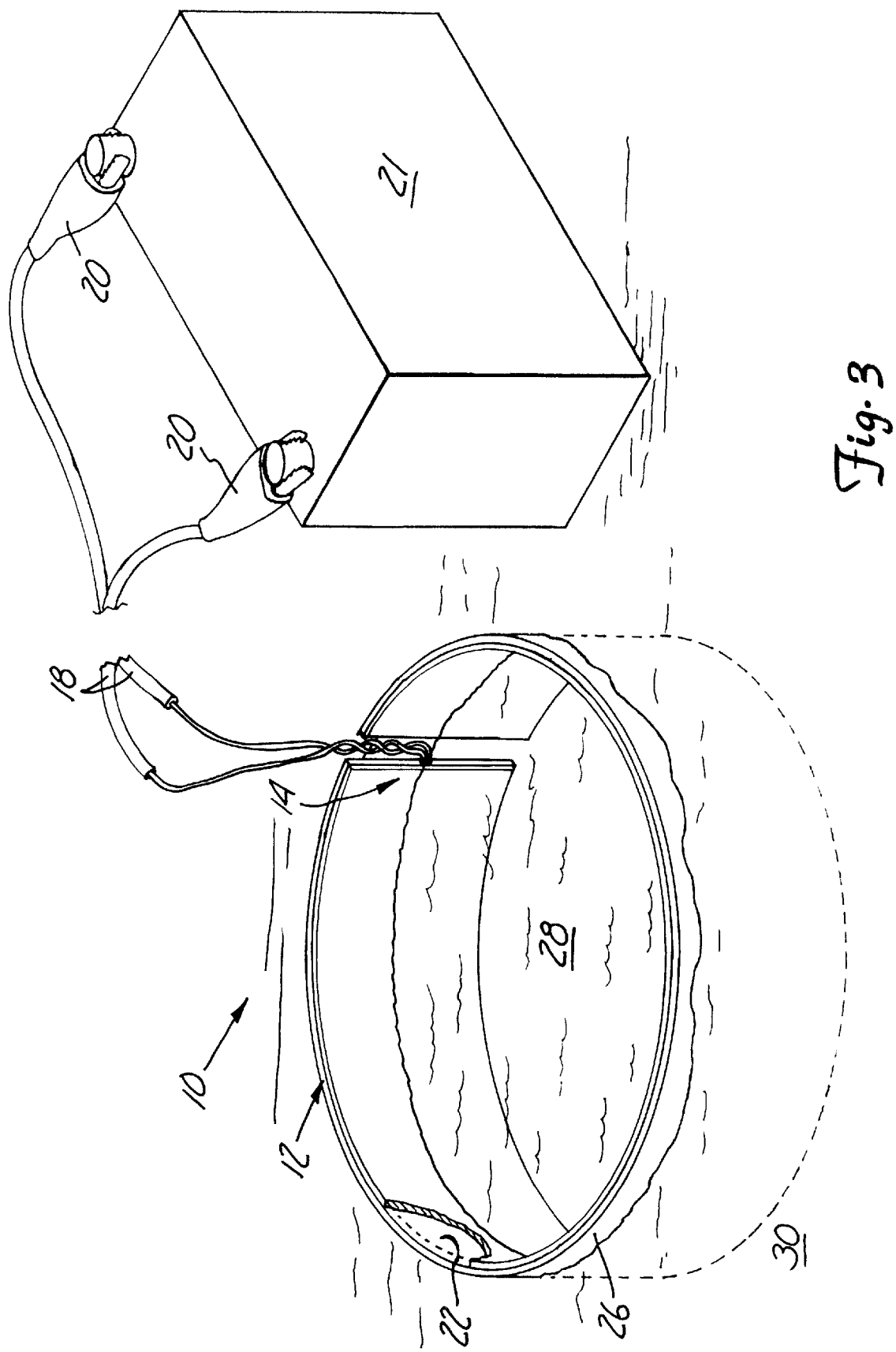

ICE FISHING HOLE HEATER

BACKGROUND OF THE INVENTION

The present invention pertains to maintaining an unfrozen hole in a sheet of ice over a body of water to enable ice fishing through the hole. More particularly, it pertains to an ice fishing hole heater.

The winter season and cold weather bring with it sheets of ice that form over lakes and other bodies of water. In order to access those bodies of water for fishing, holes are drilled through the sheet of ice enabling anglers to fish through these holes. Anglers, however, experience a recurring problem of having the ice fishing hole refreeze.

Various means and methods have been suggested to overcome this problem. An ice strainer, (a large spoon with a plurality of holes), has commonly been used to strain ice out of the hole to prevent refreezing. Other means have also been suggested such as attempting to provide heat to the hole to prevent refreezing. Unfortunately, the complexity, cost, and inconvenience of these solutions has limited their effectiveness and prevented their utilization. This fact is demonstrated by the unavailability of these types of products in the market as well as the continued use of an ice strainer to prevent the refreezing of ice fishing holes.

Some of the techniques suggested to solve the problem of the refreezing ice hole have been to funnel radiating heat into the direction of the hole. Such a technique is disclosed by Schumm in issued U.S. Pat. No. 4,006,732. However, such techniques extend above the layer of ice requiring a relatively level surface for the apparatus to be placed upon. Due to their placement, they also restrict access to the fishing hole. Additionally, such techniques are complicated to manufacture and therefore are expensive to produce.

Other proposed techniques utilize a fluid circulation system, pumping fluid through a fluid passageway within a heated housing causing the fluid to become heated. This technique is disclosed in Manuel, U.S. Pat. No. 4,911,141 and Johnson, U.S. Pat. No. 4,739,747. The heated fluid is then directed into the ice fishing hole. Again, this type of a system is extremely complex to construct and therefore expensive to produce. These types of devices are also most useful to remove a reformed ice plug from the fishing hole rather than preventing freezing of the hole during use. An additional limitation of this type of device is that it generally calls for the placement of a heating container in the proximity of the ice fishing hole. This subjects the heating container to being knocked over and hence inconveniencing the angler in having to re-setup the apparatus.

Another suggested technique is to create a buoyant, floatable heating mechanism that floats within the ice fishing hole and radiates heat through the water within the hole to prevent it from refreezing. Examples of this technique are disclosed in Peterson, U.S. Pat. No. 3,407,283 and Williams, U.S. Pat. No. 4,612,910. However, this technique is unsatisfactory because it inhibits access within the ice fishing hole. It also is easily entangled with the fishing line causing the angler difficulty in attempting to pull in the line once a catch is made, provided it does not melt and break the fishing line.

SUMMARY OF THE INVENTION

The present invention overcomes the above-mentioned disadvantages while providing an ice fishing hole heater of simple design and construction. The invention suspends a heating component within the ice fishing hole, while maintaining an unobstructed access within the ice fishing hole. By its placement within the ice fishing hole, the invention overcomes the existing problems related to devices located atop the layer of ice which funnel heated air or liquid into the hole. Its placement also prevents its entanglement with the fishing line overcoming the obstacles of a floating unit.

In a preferred embodiment, an electrical resistance heater is mounted to a sleeve which suspends the apparatus within the ice fishing hole through an outward pressure exerted against the ice forming the edge of the ice fishing hole. The sleeve also prevents heat created by the electrical resistance heater from melting the layer of ice forming the fishing hole and causing the fishing hole to enlarge. The electrical resistance heater generates heat as a result of being connected to an energy source (such as a battery). Preferably, the sleeve and electrical resistance heater are made of flexible material enabling easy placement of the apparatus within the ice fishing hole. The flexible material construct also provides for easy and compact storage.

BRIEF DESCRIPTION OF THE DRAWING

FIG. 3 is a perspective view of a second embodiment of the ice fishing hole heating device of the present invention in use.

DETAILED DESCRIPTION OF THE PREFERRED EMBODIMENTS

Figure 1:
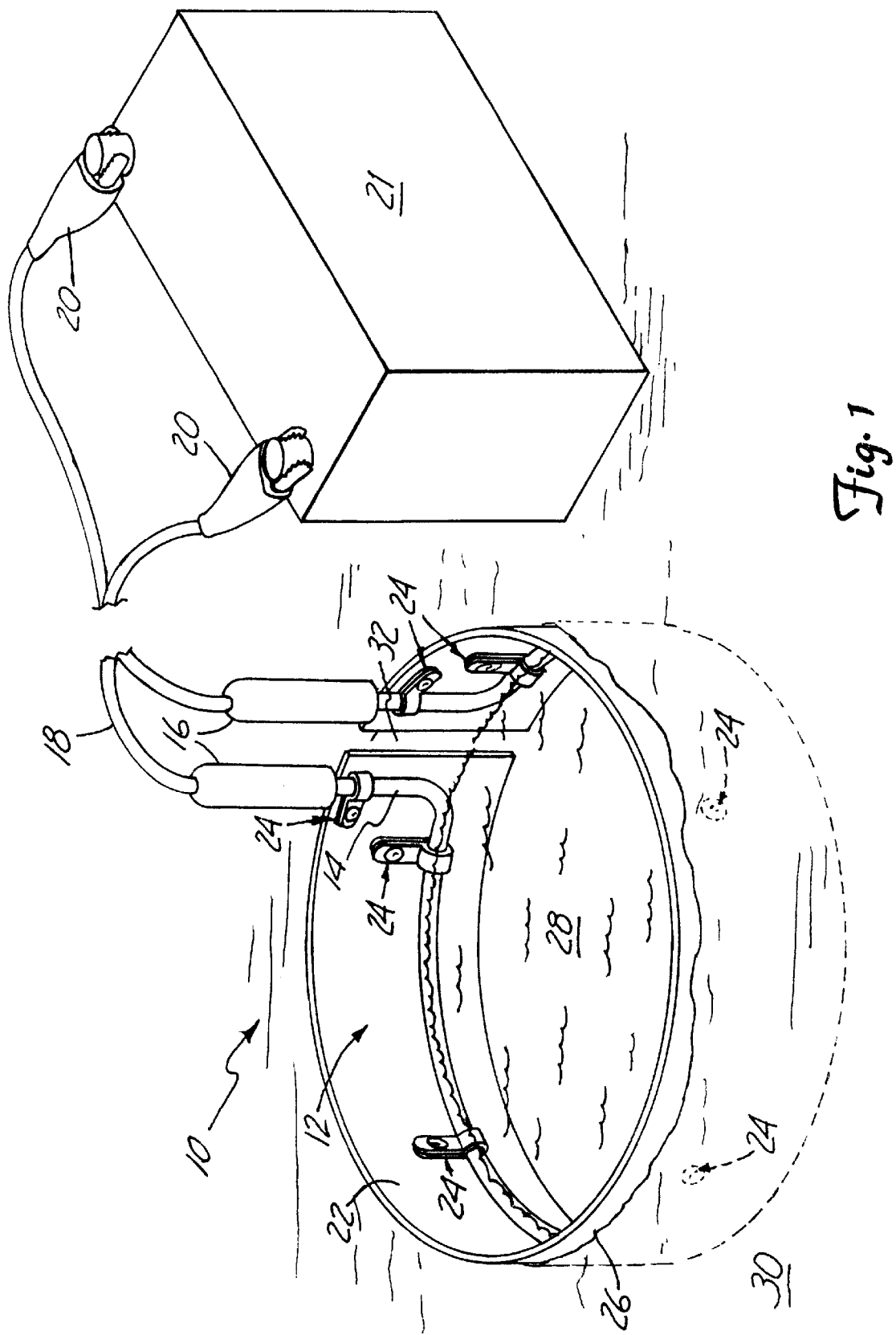
FIG. 1 is a perspective view showing a first embodiment of the ice fishing hole heating device of the present invention in use.

In FIG. 1, a preferred embodiment of the ice fishing hole heating device 10 is shown in use. The ice fishing hole heating device 10 includes a sleeve 12, an electrical resistance heater 14 and a pair of electrical leads 18. The sleeve 12 has an inner surface 22 and an outer surface 26. The electrical resistance heater 14 is mounted to the inner surface 22 of the sleeve 12 by a series of fasteners 24. Enclosed within the electrical resistance heater 14 is an electrical resistance heating element (or elements). Each end of the electrical resistance is connected to one of the electrical leads 18 at connection point 16. The opposite ends of the pair of electrical leads 18 are then terminated with a suitable connector 20 to facilitate connection to an electrical current source, such as battery 21. Once the pair of electrical leads 18 are connected to the battery 21 via the connector 20, electric current flows through the pair of electrical leads 18 and the electrical resistance heating element (or elements) enclosed within the electrical resistance heater 14. Current flow through the electrical resistance heating element (or elements) generates heat which is then radiated by the electrical resistance heater 14 to the water in an ice fishing hole 28 when the ice fishing hole heater 10 is properly in place (as shown in FIG. 1).

The electrical resistance heater 14 is preferably made of a metallic waterproof material. The metallic waterproof material encloses the electrical resistance heating element (or elements) which is wrapped in an insulator to prevent electrical shock from contact with the electrical resistance heater 14. The electrical resistance heater 14 for this embodiment is produced by Heaters Engineering, Inc., North Webster, Indiana, as part numbers 690593 for an 8" standard size hole and 411548 for a 10" standard size hole.

In a preferred embodiment, the battery 21 is a 12 volt direct current battery, such as is used in vehicles. The electrical resistance within the electrical resistance heater 14 generates approximately 75 watts of power, heating the electrical resistance heater 14 to approximately 158° F. At this power rating, the device is able to prevent the refreezing of water within the hole down to −20° F. with minimal current flow, thereby extending battery life. It also prevents any adverse affect on a fishing line that comes into contact with the electrical resistance heater 14. This is another advantage over the prior art heating devices which could melt the fishing line if it came into contact with the prior art device.

The electrical resistance heater 14, being mounted to the sleeve 12, is then suspended at water level when the ice fishing hole heating device 10 is in place. In a preferred embodiment, proper placement of the ice fishing hole heating device 10 is such that the electrical resistance heater 14 is located at the water line and is half submerged as depicted in FIG. 1.

When in place, the ice fishing hole heating device 10 suspends itself within the ice fishing hole 28 cut out of a layer of ice 30. Preferably, this is accomplished by the outer surface 26 of the sleeve 12 exerting outward pressure on the ice 30 which forms the side wall of the ice fishing hole 28. This outward pressure is created as a result of the sleeve 12 being made of a flexible, resilient plastic type material forming a substantially circular shape with an unflexed circumference slightly greater than that of the ice fishing hole 28.

In a preferred embodiment, the sleeve is made from a strip of flexible, resilient plastic type material, with dimensions of 1/16" thickness, 3" width and length for standard hole sizes of 8", 10" and 12" of 25½", 32 " and 38" respectively. These dimensions will allow the sleeve 12 to be flexed and placed within the ice fishing hole 28. Once placed within the ice fishing hole 28, the sleeve 12 is released allowing outward pressure from the sleeve 12 to cause its outer surface 26 to come into contact with the ice 30 forming the side wall of the ice fishing hole 28. This outward pressure then suspends the ice fishing hole heating device 10 within the ice fishing hole 28.

Figure 2:
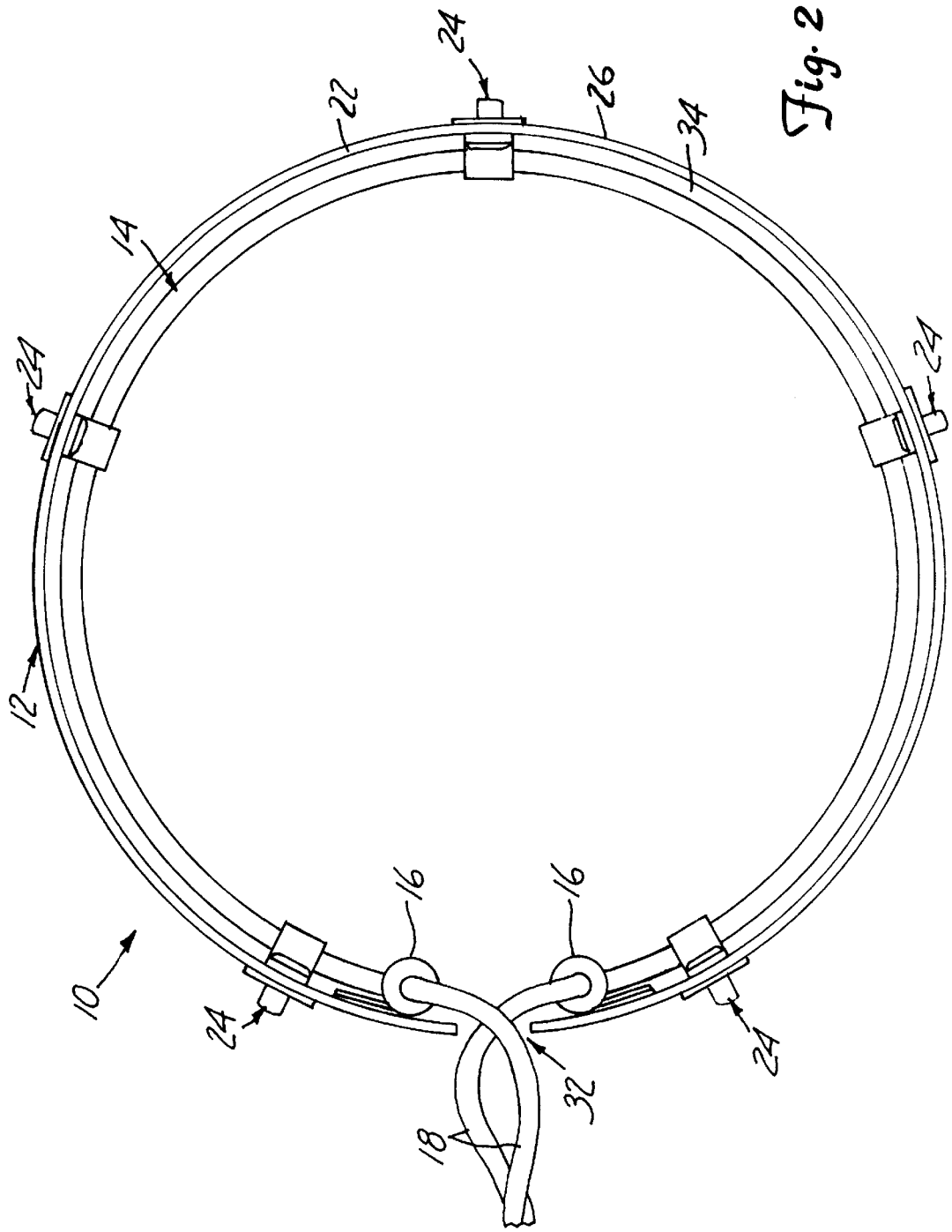
FIG. 2 is a top view of the ice fishing hole heating device of FIG. 1.

In a preferred embodiment, the sleeve 12 has an unflexed diameter which is approximately ¼" greater than the diameter of the ice fishing hole 28. This creates a substantially circular shaped sleeve 12 with a circumference slightly larger than the ice fishing hole 28. The electrical resistance heater 14 has an unflexed diameter equal to that of the ice fishing hole 28 and is fastened to the inner surface 22 of the sleeve 12 via fasteners 24. This creates a gap 34 between the electrical resistance heater 14 and the inner surface 22 of the sleeve 12 of approximately ⅛". A top view of the ice fishing hole heating device 10, as depicted in FIG. 2, identifies this gap 34.

A slit 32, in the substantially circular shaped sleeve 12, allows the user to flex the sleeve 12 thereby reducing its circumference and allowing the ice fishing hole heating device 10 to be placed into the ice fishing hole 28. Once the ice fishing hole heating device 10 is placed within the ice fishing hole 28, the sleeve 12 is released and its outward pressure suspends the ice fishing hole heating device 10 within the ice fishing hole 28. During operation, the sleeve 12 also prevents heat generated by the electrical resistance heater 14 from radiating to the layer of ice 30. This avoids embedding the ice fishing hole heating device 10 into the layer of ice 30 due to melting, which would cause the ice fishing hole 28 to enlarge. Thus, when properly in place within the ice fishing hole 28, the ice fishing hole heating device 10 provides unobstructed access while preventing refreezing of the water within the ice fishing hole 28.

FIG. 3 is another embodiment of the present invention. In FIG. 3, the electrical resistance heater 14 is adhered to the inner surface 22 of the sleeve 12 with an epoxy. In this preferred embodiment, the electrical resistance heater 14 is made of a thin flexible plastic type material. For clarity, the width of the electrical resistance heater 14 is exaggerated in FIG. 3. The electrical resistance heater 14 of this embodiment is produced by Minco Products Inc., Fridley, Minn., as part number HR7511 7939.

An electrical resistance capable of generating approximately 75 watts of power is embedded within the plastic type material. Leads from each end of the electrical resistance extend out of the plastic material and create the pair of electrical leads 18 which enable connection of the ice fishing hole heating device 10 to the battery 21. This embodiment of the present invention makes use of the ice fishing hole heating device 10 easier due to a greater flexibility of the sleeve 12 and the electrical resistance heater 14. By providing greater combined flexibility to the sleeve 12 and the electrical resistance heater 14, the device can be used in ice fishing holes of various sizes. It also facilitates easier storage because the device is not constrained to a substantially circular shape when not in use, and therefore can preferably be stored flat.

While the present invention was described in its preferred embodiment, those skilled in the art will recognize that various other means to encompass the same invention are readily identifiable. The sleeve 12 could suspend the electrical resistance heater 14 within the ice fishing hole 28 by means other than outward pressure created by the resilience of sleeve 12. The size, shape and compositional make-up of the sleeve 12 and the electrical resistance heater 14 can also be varied without departing from the scope of the invention. Furthermore, the battery 21 can be replaced by an alternating current source or by different voltage levels or types of batteries. The electrical resistance within the electrical resistance heater 14 can also be adjusted to decrease or increase the amount of power generated and hence the amount of heat to be dissipated to either extend battery life or operate the device at colder temperatures. The current embodiment allows operation down to at least −20° F. An on/off switch can also be incorporated into one of the electrical leads to facilitate activation of the device. With this device, anglers are provided an inexpensive and easy to use solution to the reoccurring problem of water freezing over in their ice fishing holes, without obstructing the hole or entangling or breaking the fishing line.

What is claimed is:

1. An electrical heating device to prevent freezing of water within an ice fishing hole cut in a sheet of ice, the device comprising:

a sleeve which substantially forms a circle with an inner and an outer surface, the sleeve having sufficient resilience such that the outer surface flexes outward to contact the ice forming a side wall of the ice fishing hole with sufficient outward pressure to suspend the heating device within the ice fishing hole;

an electrical resistance heater mounted to the inner surface of the sleeve, comprised of an electrical resistance enclosed within a waterproof jacket; and a pair of electrical leads having a waterproof jacket which extends from the electrical resistance heater maintaining the continuity of the water proof jacket for connecting the electrical resistance heater to an electrical current source.

2. A heating device to prevent freezing of water within an ice fishing hole cut in a sheet of ice, the device comprising:

a holder having sufficient resiliency to flex outward to engage a side wall of the ice fishing hole with sufficient outward force to position and secure the heating device within the ice fishing hole without obstructing the hole;

an electrical resistance enclosed within a water proof jacket mounted to the holder and positioned to contact water in the hole when the holder engages the side wall; and a pair of electrical leads enclosed in a water proof jacket which extend from the electrical resistance for connection to an electrical current source.

3. The heating device of claim 2, wherein the waterproof jacket is a metallic tube enclosing the electrical resistance and forming a substantially circular base.

4. The heating device of claim 2, wherein the waterproof jacket is a plastic type sheath enclosing the electrical resistance forming a strip.

5. The heating device of claim 2, wherein the holder comprises a sheet of flexible resilient material forming a sleeve interposed between the sheet of ice and the heating element when the device is positioned within the ice fishing hole.

6. A method for preventing freezing of water within an ice fishing hole cut in a sheet of ice using an ice fishing hole heating device, the method including:

cutting a circular hole in the sheet of ice;

flexing a resilient sleeve of the ice fishing hole heating device to which an electrical resistance heater is mounted to effectively reduce its circumference;

placing the sleeve inside the ice fishing hole;

releasing the sleeve to allow it to expand and make contact with a side wall of the ice fishing hole;

adjusting the placement of the sleeve within the ice fishing hole vertically so that the electrical resistance heater contacts the water;

connecting a pair of electrical leads which extend from the electrical resistance heater to a current source.

7. The method of claim 6, wherein the electrical resistance heater is submerged approximately halfway into the water.

8. A heating device to prevent freezing of water within an ice fishing hole cut in a sheet of ice, the device comprising:

a sleeve having an inner and an outer surface and sufficient resilience to flex outward to contact a side wall of the ice fishing hole with the outer surface such that the device remains suspended within the hole; and a heating element having a water proof jacket capable of submersion in the water and connected to the inner surface of the sleeve, the heating element further having a pair of electrical leads for connection to an electrical current source.

9. The heating device of claim 8, wherein the heating element comprises a shell made of a water resistant material and an electrical resistance enclosed by the shell which is connected to the pair of electrical leads for connection to the electrical current source.

* * * * *